Tamura

United States Patent [19]

[11] 4,100,894
[45] Jul. 18, 1978

[54] FLOW RESTRICTOR

[75] Inventor: Tooru Tamura, Toyota, Japan

[73] Assignee: Aisin Seiki Kabushiki Kaisha, Japan

[21] Appl. No.: 732,754

[22] Filed: Oct. 15, 1976

[30] Foreign Application Priority Data

Oct. 16, 1975 [JP] Japan .................. 50-141226[U]
Nov. 5, 1975 [JP] Japan .................. 50-151199[U]

[51] Int. Cl.² ........................................... F16K 21/02
[52] U.S. Cl. .................... 123/117 A; 60/304; 137/513.3; 137/513.7
[58] Field of Search .............. 123/117 A; 137/513.3, 137/513.7, 458, 540, 543.17; 60/304

[56] References Cited

U.S. PATENT DOCUMENTS 3,606,871 9/1971 Gropp et al. ................. 123/117 A
3,857,373 12/1974 Martin et al. ................. 123/117 A
3,908,370 9/1975 Kuroda ........................... 60/290

Primary Examiner—Charles J. Myhre
Assistant Examiner—Tony M. Argenbright
Attorney, Agent, or Firm—Oblon, Fisher, Spivak, McClelland & Maier

[57] ABSTRACT

A flow restrictor includes a housing having a chamber defined therein which is divided into two pressure chambers by means of a partition wall. An umbrella-shaped one-way check valve, for permitting or blocking fluidic communication between the two pressure chambers, and an orifice for restricting the fluidic communication between the two chambers, are coaxially arranged on the partition wall so as to decrease the size of the flow restrictor.

9 Claims, 2 Drawing Figures

FLOW RESTRICTOR

BACKGROUND OF THE INVENTION

1. Field of the Invention

The present invention relates generally to flow restrictors, and more particularly to a flow restrictor including a flexible umbrella-shaped one-way check valve and an orifice for controlling the fluid flow therein and within a spark advance and exhaust systems of an internal combustion engine.

2. Description of the Prior Art

Conventionally, a flow restrictor comprising a housing, a partition wall dividing the interior space of the housing into two chambers, a flexible umbrella-shaped one-way check valve, consisting of an umbrella portion which closes or opens a number of circumferentially spaced apertures provided within the partition wall so as to interrupt or establish fluidic communication between the two chambers and a stem portion which is securely received in a valve receiving bore provided within the partition wall at the central portion thereof so as to secure the valve to the partition, an orifice provided within the partition wall for establishing a restricted fluidic communication between the two chambers, and filters arranged on both sides of the orifice, is well known.

This type of flow restrictor, however, has several operational disadvantages, such as, for example, the fact that the orifice is easily plugged or clogged by dust which passes over the outer periphery of the filter, because the orifice is near the outer periphery of the filter.

Furthermore, the flow restrictor is quite large in size, because the umbrella-shaped one-way check valve and the orifice are arranged on the partition wall in a parallel fashion.

Still further, the manner of securing the check valve to the partition wall is difficult.

SUMMARY OF THE INVENTION

It is therefore an object of the present invention to provide an improved flow restrictor for obviating the above-described conventional drawbacks.

The foregoing objects are achieved through the provision of a flow restrictor which includes a housing having a chamber defined therein which is divided into two pressure chambers by means of a partition wall. An umbrella-shaped one-way check valve, for permitting or blocking fluidic communication between the two pressure chambers, and an orifice for restricting the fluidic communication between the two chambers, are coaxially arranged on the partition wall so as to decrease the size of the flow restrictor.

BRIEF DESCRIPTION OF THE DRAWINGS

Various other objects, features and attendant advantages of the present invention will be more fully appreciated as the same becomes better understood from the following detailed description when considered in connection with the accompanying drawings, in which.

DETAILED DESCRIPTION OF THE ILLUSTRATED EMBODIMENTS

Figure 1:
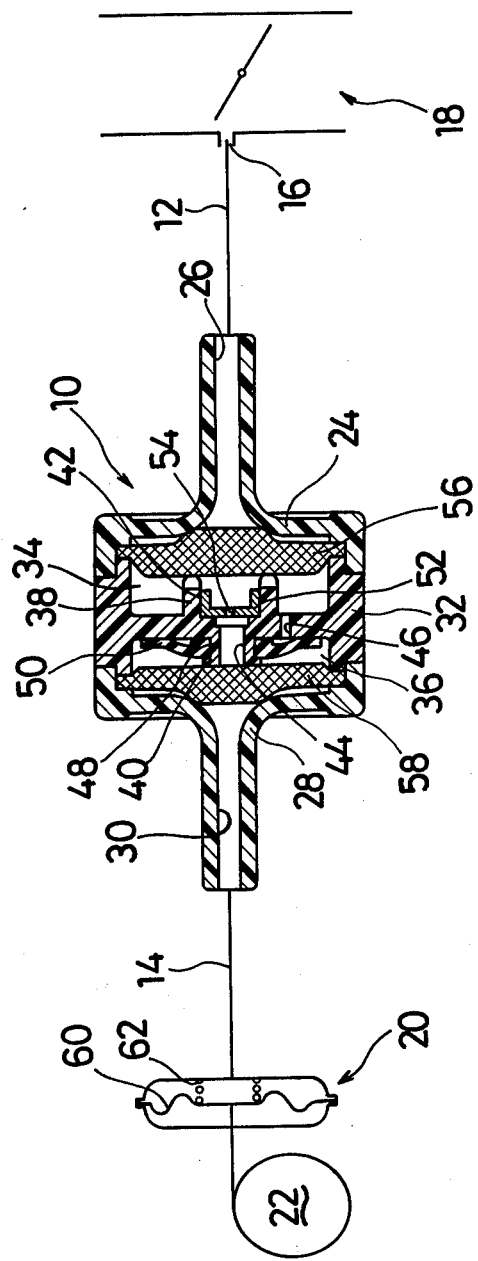
FIG. 1 is an enlarged, cross-sectional view of a flow restrictor constructed in accordance with the present invention and being utilized in a spark timing system for an internal combustion engine of a motor vehicle.

Referring now to the drawings, and more particularly to FIG. 1 thereof, there is schematically shown a first embodiment of a flow restrictor, utilized in an internal combustion engine spark advance control system, which is generally designated by reference numeral 10 and which is interconnected, in a vacuum line 12 and 14, between a ported vacuum port 16 of a carburetor 18 and a servo motor 20 in a spark advance mechanism of a distributor 22.

The flow restrictor 10 controls the application of vacuum to the vacuum motor so as to advance or retard the ignition of the engine. The flow restrictor 10 comprises a first housing section 24 which includes a tubular connection or part 26 which is connected to line 12, a second housing section 28 which includes a tubular connection or port 30 which is connected to line 14, and a partition wall 32 interposed between the housing sections. The first and second housings 24 and 28 and the partition wall 32 are tightly and sealingly united together in a serial manner, and a first chamber 34 is defined by means of the first housing 24 and the partition wall 32, which communicates with the connection 26, while a second chamber 36 is similarly defined by means of the second housing 28 and the partition wall 32, which communicates with connection 30.

First and second cylindrical projections 38 and 40, having central bores 42 and 44 defined therein respectively, project coaxially from opposite sides of the partition wall 32 at the central portion thereof, and bores 42 and 44 communicate with each other at the central portion thereof. The partition wall 32 is provided with a number of circumferentially spaced apertures 46 at the central portion thereof for establishing fluid communication between the two chambers 34 and 36, and it is seen that the second cylindrical projection 40 is formed with an annular groove 48, in the outer periphery thereof, for securely receiving the inner peripheral portion of an annular flexible, umbrella-shaped one-way check valve 50, the apertures 46 being adapted to be controlled by means of the check valve 50.

When the vacuum in the first chamber 34 is greater than that in the second chamber 36, the one-way check valve 50 closes the apertures 46 so as to interrupt the fluid communication between the two chambers 34 and 36, however, when the vacuum in the first chamber 34 is less than that in the second chamber 36, the one-way check valve 50 opens the apertures 46 by flexing away from the partition wall 32 so as to establish fluid communication between the two chambers 34 and 36.

A cylindrical orifice member 52, one end of which is closed, is pressedly inserted into the bore 42 of the first cylindrical projection 38 of partition wall 32, and the closed end of the orifice member 52 is provided with an orifice 54 at the center thereof. Orifice 54 and the one-way check valve 50 are coaxially arranged on the partition wall 32, and the orifice 54 is seen to delay the fluidic communication between the two chambers 34 and 36 when the check valve 50 closes apertures 46. First and second filters 56 and 58 are positioned between the first housing 24 and the partition wall 32, and between the second housing 26 and the partition wall 32, respectively, for filtering out foreign particles in the fluid passing through the flow restrictor 10, the outer periphery of the first filter 56 being sandwiched between the periphery of the first housing 24 and the partition wall 32, while the outer periphery of the second filter 58 is similarly sandwiched between the periphery of the second housing 26 and the partition wall 32 such that all fluid flow must go through the filters 56 and 58.

In operation of the system, when vacuum in the vacuum port 16 of the carburetor 18 increases and the vacuum in the first chamber 34 is greater than that in the second chamber 36, since the check valve 50 closes the apertures 46, the effect of the negative pressure of the vacuum in the first chamber 34 is slowly impressed upon the fluid within the second chamber 36 through means of the orifice member 52, orifice 54, and bore 44, or in other words, fluid pressure flows from chamber 36 to chamber 34. Accordingly, a diaphragm 60 in the servo motor 20, which is operatively connected to the spark advance mechanism of the distributor 22, is moved in the right direction against the biasing force of a servo spring 62 resulting in the retardation of the engine spark.

When the vacuum in the vacuum port 16 decreases, and the vacuum in the first chamber 34 is less than that in the second chamber 36, the check valve 50 is opened by means of the fluid flow from the first chamber 34 to the second chamber 36, whereby the effect of the negative pressure of the vacuum in the second chamber 36 is rapidly transmitted to the first chamber 34, through means of the apertures 46, or in other words, fluid pressure flows from chamber 34 to chamber 36, resulting in the advance of the engine spark.

Figure 2:
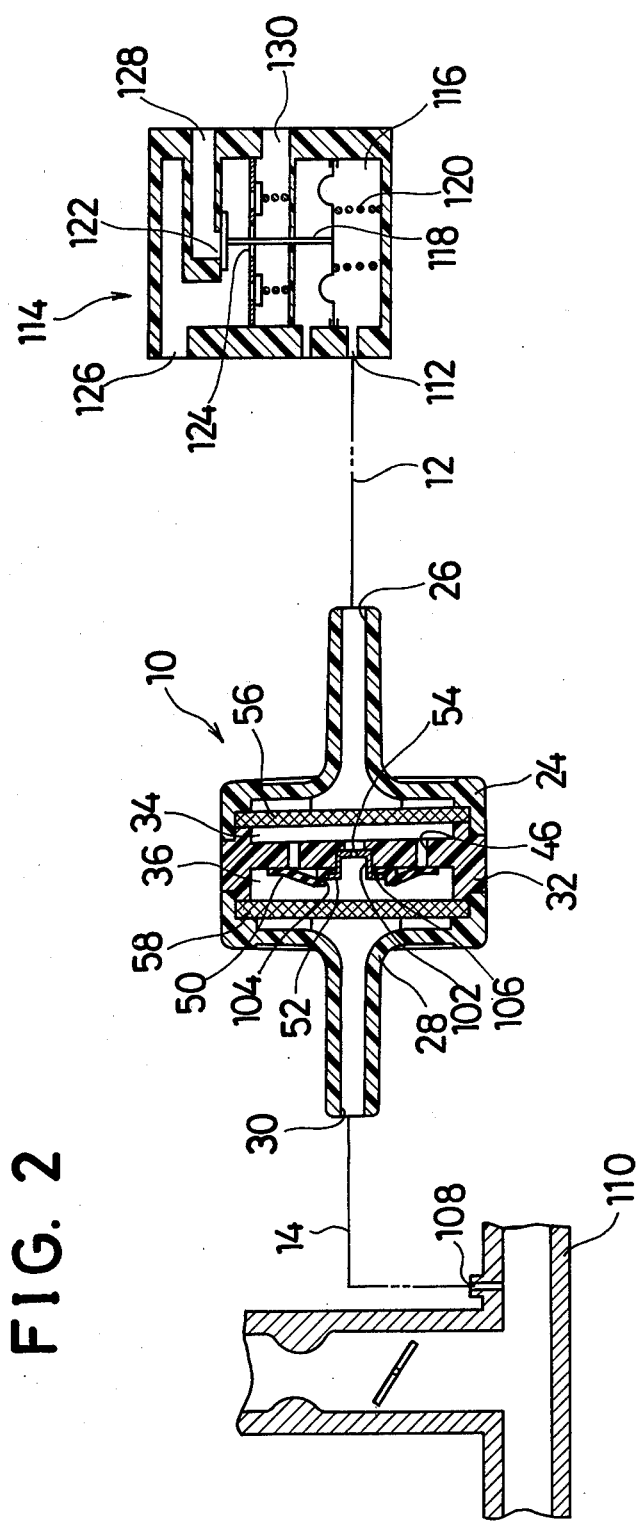
FIG. 2 is a view similar to that of FIG. 1, illustrating however a second embodiment of the present invention being utilized in an exhaust gas purifying system for an internal combustion engine of a motor vehicle.

Referring now to FIG. 2, there is shown a second embodiment of the flow restrictor, constructed according to the present invention to be utilized in an exhaust gas purifying system, and within this second embodiment, parts or portions similar to parts or portions employed in the first embodiment are shown by the same reference numerals, regardless of occasional alteration in the configurations thereof, and consequently, a detailed description of the same is omitted.

The partition wall 32 in this embodiment is provided with a stepped bore 102 having a large diameter portion and a small portion at the central portion thereof, so as to establish fluid communication between the two chambers 34 and 36, and the flexible, umbrella-shaped, one-way check valve 50 is likewise formed with a stepped, axial through hole, annular groove or bore 104 having a large diameter portion and a small diameter portion at the central portion thereof. The cylindrical orifice member 52 has an annular flange 106 extending radially from the open end thereof, and the cylindrical portion of orifice member 52 is pressedly inserted into the large diameter portion of stepped bore 102 of the partition wall 32 so as to pass through the small diameter portion of the bore 104 of the check valve 50, the flange 106 of the orifice member 52 pressing the flanged or shoulder portion of valve 50 defining bore 104 onto the partition wall 32 so as to thereby secure the check valve 50 thereto. In this case, it is additionally noted that the check valve 50 and the orifice member 52 are coaxially arranged on the same side of the partition wall 32.

The connection 30 is fluidically connected to a port 108 of an intake manifold 110 through means of the line 14, and the connection 26 is fluidically connected to a port 112 of a well known change-over valve 114. When the vacuum, which is greater than a predetermined value, is fluidically connected to a chamber 116, through means of the port 112, of valve 114, a valve assembly 118 is moved downwardly against the biasing force of a spring 120 so as to open a port 122 and close a port 124, whereby a port 126 fluidically connected to an air pump, not shown, communicates with a port 128 fluidically connected to an exhaust port, also not shown, of the engine, in which a catalyst, such as, for example, active coal, is disposed. When the vacuum, which is less than the predetermined value, is fluidically connected to chamber 116 of valve 114, through means of the port 112, the valve assembly 118 is moved upwardly by means of the spring 120 so as to close the port 122 and to open port 124, whereby the fluidic communication between port 126 and port 128 is interrupted and fluidic communication between port 126 and a port 130, fluidically connected to an air cleaner, not shown, is established.

The operation of the system utilizing the second embodiment of the present invention will now be described. When the vacuum in port 108 is greater than the predetermined value, that is, when (1) the engine is in an idling condition, (2) the vehicle is running at a low rate of speed, (3) the vehicle speed is slightly increased, or (4) the vehicle speed is decreased, the check valve 50 opens apertures 46, whereby the effects of the negative pressure of the vacuum in port 108 is rapidly transmitted to chamber 116 of the change-over valve 114 so as to establish fluidic communication between port 126 and port 128. Accordingly, atmospheric air from the air pump flows into the exhaust port of the engine, whereby carbon monoxide and hydrocarbons, which are generated in the engine condition as described hereinbefore, are purified by the oxidation operation of the catalyst in the exhaust port.

When the vacuum in port 108 is less than the predetermined value, that is, when the vehicle runs at a high rate of speed or the vehicle speed is rapidly increased, the vacuum in connection 26 is greater than that in connection 30, and consequently, the effects of the negative pressure of the vacuum in connection 26 is slowly transmitted to connection 30. Until the degree of vacuum in connection 26 reaches the predetermined value, the valve assembly 118 permits fluidic communication between port 126 and port 128, however, the valve assembly 118 interrupts the communication between ports 126 and 128 when the degree of vacuum in connection 26 is equal to the predetermined value. Accordingly, atmospheric air from the air pump is conducted to the air cleaner and not to the exhaust port, and consequently, the catalyst is prevented from burning, whereby the vehicle is likewise prevented from burning.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A flow restrictor comprising:
   a housing defining an enclosed chamber therein;
   a partition wall, dividing said chamber into first and second separate pressure chambers each of which has a port connected thereto, and having at least one aperture for providing fluidic communication between said first and second chambers;

an annular, flexible, umbrella-shaped valve an inner portion of which is secured to said partition wall, said valve closing said at least one aperture for interrupting said fluidic communication between said first and second chambers when the vacuum in said first chamber is greater than that in said second chamber, and opening said aperture for establishing fluidic communication between said first and second chambers when the vacuum in said second chamber is greater than that in said first chamber;

an orifice member having an orifice and secured to said partition wall for permitting restricted fluidic communication between said first and second chambers; and filter means positioned between said partition wall and each of said ports, the outer periphery portion of each filter being respectively securely sandwiched between said housing and said partition wall;

said partition wall, said valve, and said orifice member being coaxially arranged and wherein said partition wall is provided with a cylindrical projection axially projecting from one side of said partition wall and said orifice member is pressedly inserted into said projection.

2. A flow restrictor as claimed in claim 1, wherein: said orifice member comprises a cylindrical member, one end of which is closed and is provided with said orifice.

3. A flow restrictor as claimed in claim 1, wherein: said partition wall is provided with a coaxial cylindrical projection extending from one side thereof, the inner periphery of said valve tightly surrounding the outer periphery of said cylindrical projection.

4. A flow restrictor as claimed in claim 1, wherein: said cylindrical projection is provided with an annular groove for securely receiving the inner peripheral portion of said valve.

5. A flow restrictor comprising:
a housing defining an enclosed chamber therein;
a partition wall, dividing said chamber into first and second separate pressure chambers each of which has a port connected thereto, and having at least one aperture for providing fluidic communication between said first and second chambers;
an annular, flexible, umbrella-shaped valve an inner portion of which is secured to said partition wall, said valve closing said at least one aperture for interrupting said fluidic communication between said first and second chambers when the vacuum in said first chamber is greater than that in said second chamber, and opening said aperture for establishing fluidic communication between said first and second chambers when the vacuum in said second chamber is greater than that in said first chamber;
an orifice member having an orifice and secured to said partition wall for permitting restricted fluidic communication between said first and second chambers; and
filter means positioned between said partition wall and each of said ports, the outer periphery portion of each filter being respectively securely sandwiched between said housing and said partition wall;
said partition wall, said valve, and said orifice member being coaxially arranged wherein said partition wall is provided with first and second coaxial cylindrical projections extending oppositely from both sides thereof, the inner periphery of said valve tightly surrounding the outer periphery of said second cylindrical projection; and said orifice member being pressedly inserted into said first cylindrical projection.

6. A flow restrictor as claimed in claim 5, wherein:
said port connected to said first chamber is fluidically connected to a port of a carburetor; and
said port connected to said second chamber is fluidically connected to a servo motor in a spark advance mechanism of a distributor for a motor vehicle.

7. A flow restrictor comprising:
a housing defining an enclosed chamber therein;
a partition wall, dividing said chamber into first and second separate pressure chambers each of which has a port connected thereto, and having at least one aperture for providing fluidic communication between said first and second chambers;
an annular, flexible, umbrella-shaped valve an inner portion of which is secured to said partition wall, said valve closing said at least one aperture for interrupting said fluidic communication between said first and second chambers when the vacuum in said first chamber is greater than that in said second chamber, and opening said aperture for establishing fluidic communication between said first and second chambers when the vacuum in said second chamber is greater than that in said first chamber;
an orifice member having an orifice and secured to said partition wall for permitting restricted fluidic communication between said first and second chambers; and
filter means positioned between said partition wall and each of said ports, the outer periphery portion of each filter being respectively securely sandwiched between said housing and said partition wall;
said partition wall, said valve, and said orifice member being coaxially arranged wherein said partition is provided with an axially extending stepped bore; said orifice member comprises a cylindrical portion, having said orifice, and an annular flange portion extending radially outwardly from one end of said cylindrical portion, said cylindrical portion being pressedly inserted into a large diameter portion of said stepped bore and through said valve, and said flange portion presses the inner peripheral portion of said valve onto said partition wall.

8. A flow restrictor as claimed in claim 7, wherein:
said valve is provided with an annular groove at said inner peripheral portion for receiving said flange portion of said orifice member.

9. A flow restrictor as claimed in claim 7, wherein:
said port connected to said first chamber is fluidically connected to a port of an intake manifold; and
said port connected to said second chamber is fluidically connected to a port of a change-over valve which controls an atmospheric air supply from an air pump to an exhaust port of an engine for a motor vehicle.

* * * * *